(12) United States Patent
Ugale

(10) Patent No.: US 11,066,060 B2
(45) Date of Patent: Jul. 20, 2021

(54) B6+3 BRIDGE FOR MOTOR CONTROL AND SERIES PASS REGULATION IN AN INTEGRATED STARTER GENERATOR APPLICATION

(71) Applicant: Infineon Technologies AG, Neubiberg (DE)

(72) Inventor: Ramdas Rangnath Ugale, Pune (IN)

(73) Assignee: Infineon Technologies AG, Neubiberg (DE)

( * ) Notice: Subject to any disclaimer, the term of this patent is extended or adjusted under 35 U.S.C. 154(b) by 372 days.

(21) Appl. No.: 16/110,997

(22) Filed: Aug. 23, 2018

(65) Prior Publication Data

US 2020/0062234 A1    Feb. 27, 2020

(51) Int. Cl.
| | | |
|---|---|---|
| *B60W 10/06* | (2006.01) | |
| *H02H 7/08* | (2006.01) | |
| *H02J 7/16* | (2006.01) | |
| *H02M 3/07* | (2006.01) | |
| *B60W 30/18* | (2012.01) | |
| *B60W 10/26* | (2006.01) | |

(52) U.S. Cl.
CPC .......... *B60W 10/06* (2013.01); *H02H 7/0838* (2013.01); *H02J 7/163* (2013.01); *H02M 3/07* (2013.01); *B60W 10/26* (2013.01); *B60W 30/18018* (2013.01)

(58) Field of Classification Search
CPC ................. B60W 10/06; B60W 10/26; B60W 30/18018; H02H 7/0838; H02J 7/163; H02M 3/07
See application file for complete search history.

(56) References Cited

U.S. PATENT DOCUMENTS

| | | | |
|---|---|---|---|
| 2003/0137858 A1* | 7/2003 | Tsuji ...................... | H02M 1/32 363/132 |
| 2020/0021282 A1* | 1/2020 | Yamamoto ......... | H03K 17/0826 |
| 2020/0067502 A1* | 2/2020 | Hiyama ............ | H03K 17/08122 |

OTHER PUBLICATIONS

"How to calculate the conduction angle of a CVD diode?," Electrical Engineering Stack Exchange, accessed from https://electronics.stackexchange.com/questions/257293/how-to-calculate-the-conduction-angle-of-a-cvd-diode, earliest date of access on or around May 15, 2018, 6 pp.

(Continued)

*Primary Examiner* — Zoheb S Imtiaz
(74) *Attorney, Agent, or Firm* — Shumaker & Sieffert, P.A.

(57) ABSTRACT

This disclosure describes a control circuit to manage the energy flow for an integrated motor generator (IMG), such as an integrated starter generator (ISG) system. The circuit regulates the output voltage of the IMG when the IMG operates in generator mode. The circuit includes an additional switch for each phase connected in anti-series with the half-bridge circuit for the phase, e.g., the drain of the additional switch connects to the drain of the high-side switch. When the ISG is in generator mode, the additional switches are controlled, e.g., to charge the battery at a constant voltage and current throughout the speed range of the ISG (i.e. high rpm and low rpm). In generator mode, the high-side switches may be turned off, which configures the high-side switches to act as a diode and block battery discharge for low rpm operation when the phase voltages are lower.

20 Claims, 5 Drawing Sheets

SCR configuration

(56) References Cited

OTHER PUBLICATIONS

"Power MOSFET Basics: Understanding the Turn-On Process," Vishay Siliconix, Application Note AN850, document No. 68214, Jun. 23, 2015, accessed from https://www.vishay.com/docs/68214/turnonprocess.pdf, 4 pp.

Fuller, "How Idle-stop Systems Work," How Stuff Works, accessed from https://auto.howstuffworks.com/fuel-efficiency/hybrid-technology/idle-stop-system2.htm earliest date of access on or around Apr. 23, 2018, article published online Jul. 6, 2009, 5 pp.

Szabo, "Integrated Starter-Generators for Automotive Applications," Acta Electrotehnica, vol. 45, No. 3, 2004, (Applicant points out, in accordance with MPEP 609.04(a), that the year of publication, 2004, is sufficiently earlier than the effective U.S. filing date, so that the particular month of publication is not in issue.) 7 pp.

Teccor, "Phase Control Using Thyristors," AN1003, accessed from http://www.learnabout-electronics.org/Downloads/Littelfuse_App_Note_AN1003.pdf, Sep. 23, 2013, 9 pp.

Wikipedia, "Start-stop system," Wikipedia the free Encyclopedia, last edit made Apr. 18, 2018, accessed from https://en.wikipedia.org/wiki/Start-stop_system earliest date of access on or around Apr. 23, 2018, 8 pp.

Wren, "What is Auto Stop/Start? Autoweek Explains," Autoweek Online, accessed from http://autoweek.com/article/technology/what-auto-stop-start-autoweek-explains, article published Mar. 28, 2017, 3 pp.

\* cited by examiner

TURN OFF EACH RESPECTIVE HIGH-SIDE SWITCH AND EACH RESPECTIVE LOW-SIDE SWITCH OF ONE OR MORE HALF-BRIDGE CIRCUITS, WHEREIN THE ONE OR MORE HALF-BRIDGE CIRCUITS ARE CONFIGURED TO CONTROL AN INTEGRATED MOTOR GENERATOR WHILE THE INTEGRATED MOTOR GENERATOR OPERATES IN MOTOR MODE ⟶ 90

WHILE THE INTEGRATED MOTOR GENERATOR OPERATES IN GENERATOR MODE, CONTROL A CONDUCTION TIME OF ONE OR MORE SERIES REGULATION SWITCHES, WHEREIN EACH SERIES REGULATION SWITCH OF THE ONE OR MORE SERIES REGULATION SWITCHES IS CONNECTED ANTI-SERIES TO A RESPECTIVE HIGH-SIDE SWITCH OF THE ONE OR MORE HALF-BRIDGE CIRCUITS ⟶ 92

FIG. 5

B6+3 BRIDGE FOR MOTOR CONTROL AND SERIES PASS REGULATION IN AN INTEGRATED STARTER GENERATOR APPLICATION

TECHNICAL FIELD

The disclosure relates to motor control circuits.

BACKGROUND

An integrated starter-generator (ISG) may be used to replace both the conventional starter system and the alternator (generator) of a vehicle, such as an automobile. In some examples, an ISG may allow greater electrical generation capacity and may be used in an internal combustion engine (ICE) or in a hybrid electric vehicles (HEV) that may combine an ICE with an electric drive. Rather than a starter motor with a sliding gear that connects to the crankshaft during startup of the ICE, an ISG may replace the starter motor by including a stator coil with an alternating current generator directly connected to the crankshaft of an ICE. The ISG receives energy, e.g. from a battery, while in motor mode to start the ICE.

When an ICE is running on fuel, such as propane or petrol, the ISG operates in generator mode to power electrical services in the vehicle and recharge the battery. In some examples an ISG may have contrary specifications, such a high starting torque and a field weakening capability in a wide speed range. Some examples of ISGs may be used in vehicles with automatic idle-stop systems, which stop the engine from idling when the vehicle, such as an automobile, is stopped, for example in heavy traffic or at an intersection.

SUMMARY

In general, the disclosure is directed to a control circuit to manage the energy flow for an integrated motor generator (IMG), such as an integrated starter generator (ISG) system. The circuit regulates the output voltage of the integrated motor generator when the integrated motor generator operates in generator mode. The circuit includes a switch for each phase connected in anti-series with a half-bridge circuit for the phase. The control circuit also includes switch control circuitry and a switch control scheme to operate the control circuit throughout the range of operating conditions, including starting, low revolutions per minute (rpm) and high rpm operation.

The half-bridge for the ISG system may comprise two switches connected in series. In the example of n-channel power field effect transistors (FETs), connecting in series means the source of the high-side switch connects to the drain of the low-side switch. A circuit of this disclosure include an additional switch connected in anti-series to each half-bridge branch. Connecting in anti-series, in an n-channel example, means the drain of the additional n-channel switch connects to the drain of the high-side switch. When the ISG is in generator mode, the additional switches are controlled, e.g. by the control circuit or a motor control unit (MCU), to charge the battery at a constant voltage throughout the speed range of the ISG (i.e. high rpm and low rpm). In generator mode, the high-side switches are turned off, which configures the high-side switches to act as a diode and block battery discharge for low rpm operation when the phase voltages are lower. When in motor mode, the control circuit may turn on the additional switches and control the high-side and low-side switches to drive the motor using power from the battery, or some other source of electrical power.

In one example, the disclosure is directed to a control circuit for an integrated motor generator, the circuit comprising: a switch comprising a gate terminal and a current channel including a first terminal and a second terminal, and a switch driver circuit comprising a first gate control output terminal, a second gate control output terminal and a third gate control output terminal. The first gate control output electrically connects to the gate terminal of the switch, the second gate control output terminal is configured to control a gate terminal of a half-bridge circuit high-side switch, and the third gate control output terminal is configured to control a gate terminal of a half-bridge circuit low-side switch; and wherein the first terminal of the switch connects to the high-side switch on a side of the high-side switch opposite a switch node of the half-bridge circuit.

In another example, the disclosure is directed to system comprising; an integrated motor generator configured to operate in motor mode and in generator mode, a half-bridge circuit, comprising a high-side switch coupled to a low-side switch. The half-bridge circuit is: coupled to the integrated motor generator at the switch node of the half-bridge circuit; and configured to control the operation of the integrated motor generator. The system also includes a control circuit comprising: a switch comprising a gate terminal and a current channel including a first terminal and a second terminal, a switch driver circuit comprising a control input, a first gate control output terminal, a second gate control output terminal and a third gate control output terminal. The first gate control output electrically connects to the gate terminal of the switch, the second gate control output terminal is configured to control a gate terminal of a half-bridge circuit high-side switch, the third gate control output terminal is configured to control a gate terminal of a half-bridge circuit low-side switch, and the first terminal of the switch connects to a current channel of the high-side switch on a side of the high-side switch opposite the switch node of the half-bridge circuit. The system also includes processing circuitry operatively coupled to the half-bridge circuit and the control circuit and configured to receive sense signals from the half-bridge circuit and the integrated motor generator.

In another example, the disclosure is directed to a method of regulating an output voltage of an integrated motor generator, the method comprising: turning off each respective high-side switch and each respective low-side switch of one or more half-bridge circuits, wherein the one or more half-bridge circuits are configured to control the integrated motor generator while the integrated motor generator operates in motor mode. While the integrated motor generator operates in generator mode, controlling a conduction time of one or more series regulation switches, wherein each series regulation switch of the one or more series regulation switches is connected anti-series to a respective high-side switch of the one or more half-bridge circuits.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 is a flow chart illustrating an example operation of a series regulation circuit for an integrated motor generator according to one or more techniques of this disclosure.

DETAILED DESCRIPTION

Figure 1:
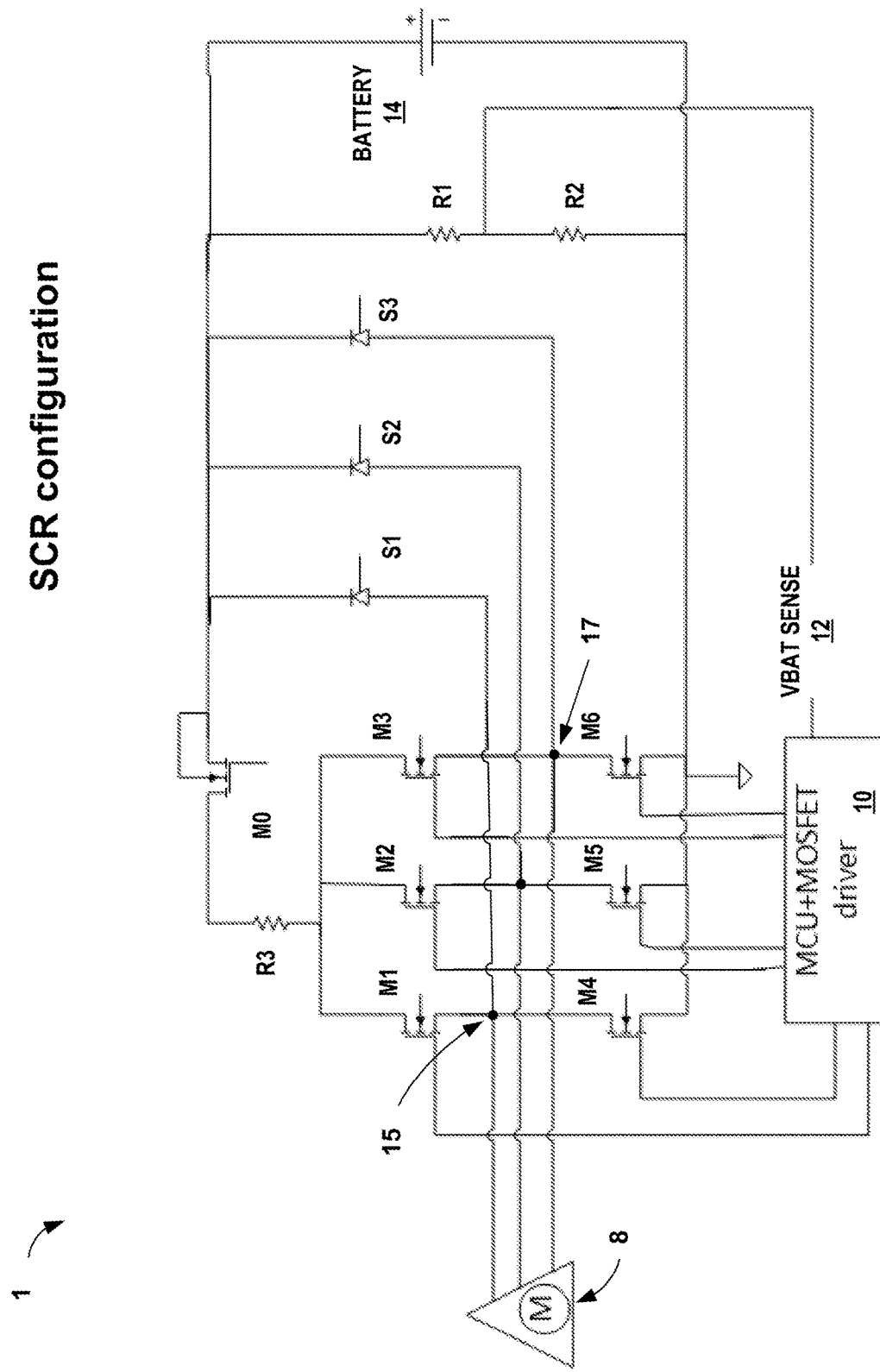
FIG. 1 is a schematic diagram illustrating an example series regulation circuit using SCRs.

This disclosure describes a control circuit to manage the energy flow for an integrated motor generator, such as an integrated starter generator (ISG) system. The circuit regulates the output voltage of the integrated motor generator when the integrated motor generator operates in generator mode. The circuit includes a switch for each phase connected in anti-series with a half-bridge circuit for the phase. The control circuit also includes switch control circuitry and a switch control scheme to operate the control circuit throughout the range of operating conditions, including starting, low revolutions per minute (rpm) and high rpm operation.

The half-bridge for the integrated motor generator (IMG) may comprise two switches connected in series for each motor phase. In the example of an n-channel power field effect transistors (FETs), connecting in series means the source of the high-side switch connects to the drain of the low-side switch. The techniques of this disclosure include an additional switch connected in anti-series to each half-bridge branch. Continuing the n-channel example, connecting in anti-series means the drain of the additional switch connects to the drain of the high-side switch. For example, a three-phase motor, may include three half-bridge branches and three additional switches connected in anti-series with each branch.

In some examples, when in motor mode, a control circuit, e.g. a motor control unit (MCU) turns on the additional switches as well as controls the high-side and low-side switches to drive the ISG in motor mode using power from the battery, such as to start an internal combustion engine (ICE). In the example of a vehicle with an automatic idle-stop system, when the vehicle driver releases the brake and presses the accelerator, the MCU may cause the ISG to draw power from the battery to rotate the ISG in motor mode and start the ICE. In some examples the ISG may provide a power assist, such as when under an increased load.

When the ISG is in generator mode, the additional switches are controlled, e.g. by the control circuit or directly by the MCU, to charge the battery at a constant voltage throughout the speed range of the ISG (i.e. high rpm and low rpm). The high-side switches may be turned off, which configures the high-side switches to act as a diode and block battery discharge for low rpm operation when the phase voltages are lower. The low-side switches may also be turned off, which causes rectification to happen through the body diode of the low-side switches.

In some examples, the MCU can manage synchronized negative phase cycle rectification through software by sensing each phase zero-cross point either by ADC or external interrupt. By managing the rectification, the MCU, or similar circuit, may turn on the low side switches during the portions of the cycle when the body diode would be conducting. Therefore, instead of the current flowing through the body diode, the current may flow through the transistor current channel. The $R_{DS-ON}$ of the transistor current channel may dissipate less power than for current through the body diode.

In some examples, the MCU, or similar circuit, controls the voltage and current regulation to charge the battery by controlling the conduction time of each additional switch. As the speed (i.e., revolutions per minute (RPM)) of the generator increases, the phase voltages may increase, and the MCU may control the conduction time of the additional switches. The MCU may determine the conduction time by monitoring parameters of the ISG system, such as battery voltage, charging current, the switch node voltage for each phase, the zero-crossing point of each phase and similar parameters. In some examples, the MCU may receive monitored signals via an analog to digital converter (ADC) circuit.

The techniques of this disclosure may use series regulation to provide a constant output voltage because series regulation may be more efficient than shunt regulation for an ISG system. Shunt regulation may allow the use of lower voltage devices, but in an ISG application shunt regulation may keep a load on the ICE portion of the ISG system even when there is no load on the engine. Series regulation does not put a load on the engine portion of the ISG in a no-load condition and therefore may be more efficient than shunt regulation for an ISG application. However, when motor acts as a generator at high rpm, the generator may output high voltages at high rpm, in some examples exceeding 50 Vrms, which the system may regulate to a lower voltage. The techniques of this disclosure allow the use of the more efficient series regulation throughout the operating range of the ISG system. The configuration of the anti-series switches with the half-bridge branches also provides reverse battery protection because of the anti-series body diodes.

Advantages of the techniques and circuit configurations of this disclosure include reduced power dissipation, fewer components, lower cost, and reduced size when compared to other techniques. For example, when compared to using silicon controlled rectifiers (SCRs) for each phase, each SCR may have a high voltage drop across the SCR resulting in high power dissipation and which may require a large heat sink to help manage the SCR heating and therefore may result in an increased control circuit size. Using a metal-oxide semiconductor field effect transistor (MOSFET) and diode combination in series with each phase is another series regulation technique, which may result in additional components, higher cost and a larger sized circuit.

FIG. 1 is a schematic diagram illustrating an example series regulation circuit using SCRs. Circuit 1 may be used to control and regulate the voltage for a three-phase integrated motor generator, such as may be used in an ISG system.

Circuit 1 includes integrated motor generator (IMG) 8, MCU 10, a half-bridge circuit for each phase, an SCR for each phase, battery 14 and other circuit components such as transistor M0.

In the example of FIG. 1, MCU 10 also includes a MOSFET driver circuit to drive the gates of each half-bridge. In other examples, the driver circuit may be a separate circuit controlled by MCU 10. MCU 10 receives a VBAT sense signal 12 for battery 14 via a resistor divider comprising resistors R1 and R2. MCU 10 may also control the gates of transistor M0 and SCRs S1-S2.

MCU 10 may include processing circuitry, which may include any type of processor including a microcontroller (MCU), e.g. a computer on a single integrated circuit containing a processor core, memory, and programmable input/output peripherals, a microprocessor (μP), e.g. a central processing unit (CPU) on a single integrated circuit (IC). Some examples of processing circuitry that may be included in MCU 10 may also include, any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and the integrated processing circuitry may be realized as fixed hardware processing circuitry, programmable processing circuitry and/or a combination of both fixed and programmable processing circuitry.

Circuit 1 includes a half-bridge circuit for each phase. In the example of FIG. 1, the half-bridge circuits are n-channel MOSFETs with the source of each high-side transistors M1, M2 and M3 connected to the drain of M0 through resistor R3. The drain of M1 connects to the source of low-side transistor M4, the drain of M2 connects to the source of low-side transistor M5, the drain of M6 connects to the source of low-side transistor M6. Transistors M1 and M4, M2 and M5 and M3 and M6 form the three half-bridge circuits for the three phases of IMG 8. In this disclosure, the half-bridge configuration of transistors M1-M6 may be referred to as a B6 half-bridge.

Each half-bridge circuit includes a switch node (SW node), which is the node that connects the source of the high-side transistor to the drain of the low-side transistor. In the example of FIG. 1, switch node 15 is for the half-bridge circuit including transistors M1 and M4 and switch node 17 is for the half-bridge circuit including transistors M3 and M6. For clarity, the switch node for the half-bridge circuit including transistors M2 and M5 is not labeled. The switch node of each half-bridge circuit connects to IMG 8.

The anode of each SCRs S1-S3 connects to each respective switch node. For example, the anode of SCR S1 connects to switch node 15, the anode of SCR S3 connects to switch node 17 and the anode of SCR S2 connects the half-bridge circuit including transistors M2 and M5. The cathodes of SCRs S1-S3 all connect to the node including the source of transistor M0 and the positive terminal of battery 14.

In operation, MCU 10 may control the gates of the half-bridge circuits and transistor M0 while IMG 8 is in motor mode to control the torque, speed in revolutions per minute (rpm) and so on of IMG 8, to control the electrical energy from battery 14 to IMG 8. For example, in an ISG system, when a vehicle is stopped, the ICE (not shown in FIG. 1) of the vehicle may be stopped. When the vehicle driver presses the accelerator pedal, or in some examples, releases the brake pedal, MCU 10 may receive a signal to start the ICE. MCU 10 may control IMG 8 in motor mode to start the ICE.

When the ICE is running, MCU 10 may control the gates of the half-bridge circuits as well as the gates of M0 and SCRs S1-S3 to rectify and regulate the voltage from IMG 8, which may be operating in generator mode. In some examples, MCU 10 may control the conduction angle, i.e. the time an SCR is conducting, to regulate the output voltage from IMG 8. The electrical energy from IMG 8 in generator mode may charge battery 14, as well as support other electrical loads in the vehicle, such as lighting, LED indicators, fans and other electrical loads.

Circuit 1 may have some disadvantages over other types of circuits that may regulate the voltage from IMG 8. Because circuit 1 is a series regulation circuit, it may be more efficient than a shunt regulation circuit, but may operate at higher voltages, e.g. approximately 50 Vrms in some examples. Use of an SCR may result in a voltage drop across the SCR which may result in higher power dissipation across the SCR. The higher power dissipation may result in the SCRs reaching a high temperature, and therefore using a large heat sink to dissipate the heat and protect the circuit. A large heat sink may result in a larger, heavier and more expensive MCU than with other examples.

Figure 2:
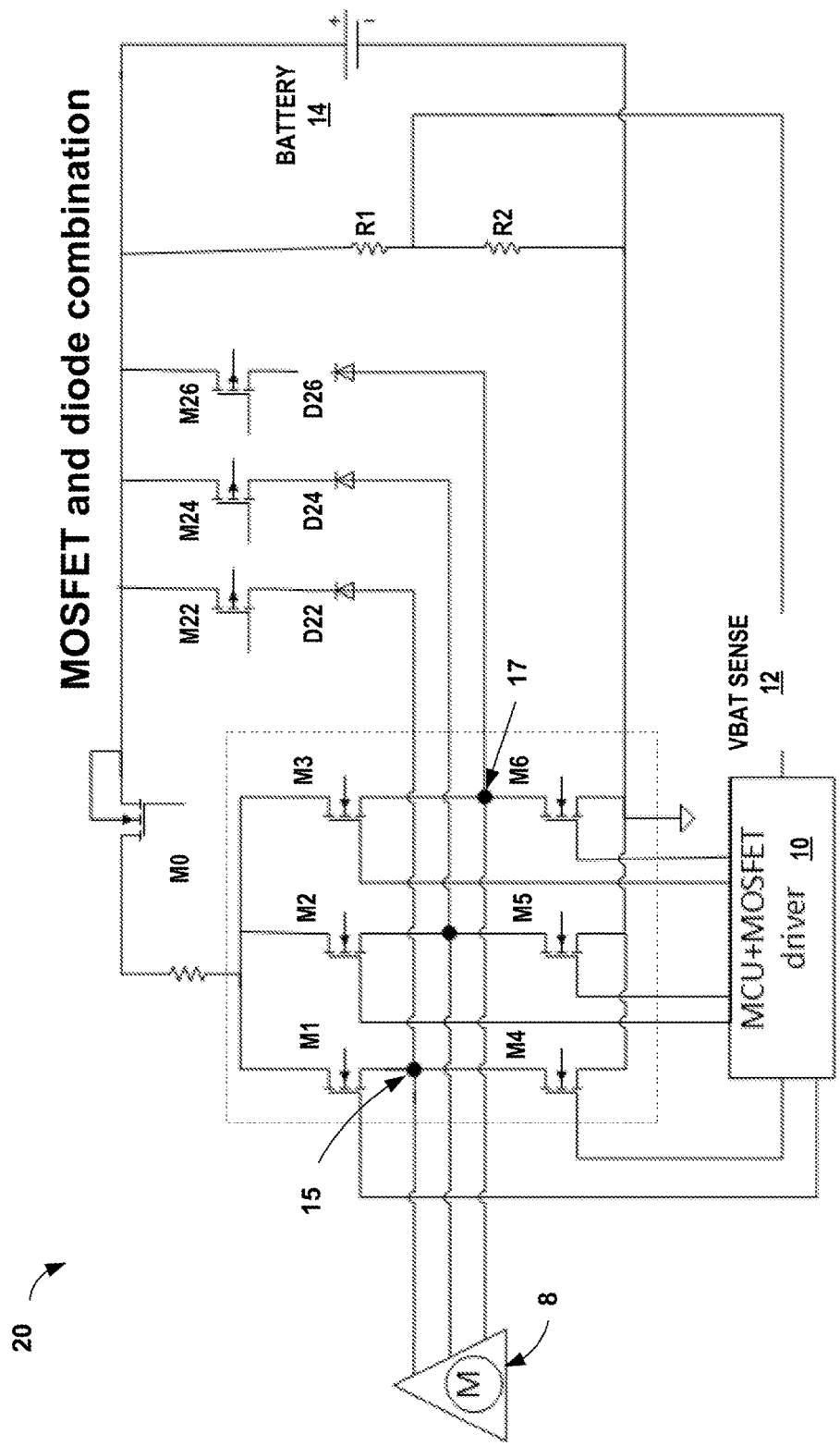
FIG. 2 is a schematic diagram illustrating an example series regulation circuit using a MOSFET and diode configuration.

FIG. 2 is a schematic diagram illustrating an example series regulation circuit using a MOSFET and diode configuration. Elements of FIG. 2 with the same reference numbers as shown in FIG. 1 have the same properties, connections and functions. For example, MCU 10, IMG 8, battery 14, half-bridge circuits with transistors M1 and M4, M2 and M5 and M3 and M6 with switch nodes 15 and 17, as well as Vbat sense 12 from resistors R1 and R2 all have the same properties, connections and functions as described above in relation to FIG. 1.

In contrast to circuit 1 of FIG. 1, the example circuit 20 of FIG. 2 includes a p-channel MOSFET and a diode combination for each phase, rather than an SCR for each phase. The drains of transistors M22, M24 and M26 all connect to the node including the source of transistor M0 and the positive terminal of battery 14. The source of transistor M22 connects to switch node 15 through diode D22, source of transistor M26 connects to switch node 17 through diode D26 and the source of transistor M24 connects to the switch node for the half-bridge circuit including transistors M2 and M5 through diode D24. The anode of diode D22 connects to switch node 15 and the cathode connects to the source of transistor M22. Likewise, anode of diode D26 connects to switch node 17 and the cathode connects to the source of transistor M26 and the anode of diode D24 connects to the switch node for the half-bridge circuit including transistors M2 and M5 and the cathode connects to the source of transistor M24.

Similar to the example of FIG. 1, in operation MCU 10 may control the gates of the half-bridge circuits and transistor M0 while IMG 8 is in motor mode to control the torque, speed in revolutions per minute (rpm) and so on of IMG 8, to drive IMG 8 as a motor. When IMG 8 is in generator mode, MCU 10 may control the gates of the half-bridge circuits as well as the gates of M0 and transistors M22, M24 and M26 to rectify and regulate the voltage from IMG 8 by phase control of the conduction angle of transistors M22, M24 and M26. Similar to circuit 1 described above in relation to FIG. 1, by controlling the conduction angle, MCU 10 may provide an approximately constant voltage to battery 14 and to other electrical loads in a vehicle. In the example of an automobile with a 12 VDC battery, MCU 10 may provide an output voltage to battery 14 of approximately 13 VDC.

Circuit 20 may have some disadvantages over other types of circuits that may regulate the voltage from IMG 8. As with circuit 1, described above in relation to FIG. 1, circuit 20 is a series regulation circuit, which may be more efficient than a shunt regulation circuit, but may operate at higher voltages. Also, the MOSFET and diode combination of circuit 20 includes seven power devices in the bill of materials (BOM) for the circuit, in addition to the transistors in the half-bridge circuits. The seven devices, transistor M0, transistors M22, M24 and M26 as well as diodes D22-D26, may increase size, complexity and cost of an engine control unit (ECU), when compared to other examples of series regulation circuits.

Figure 3:
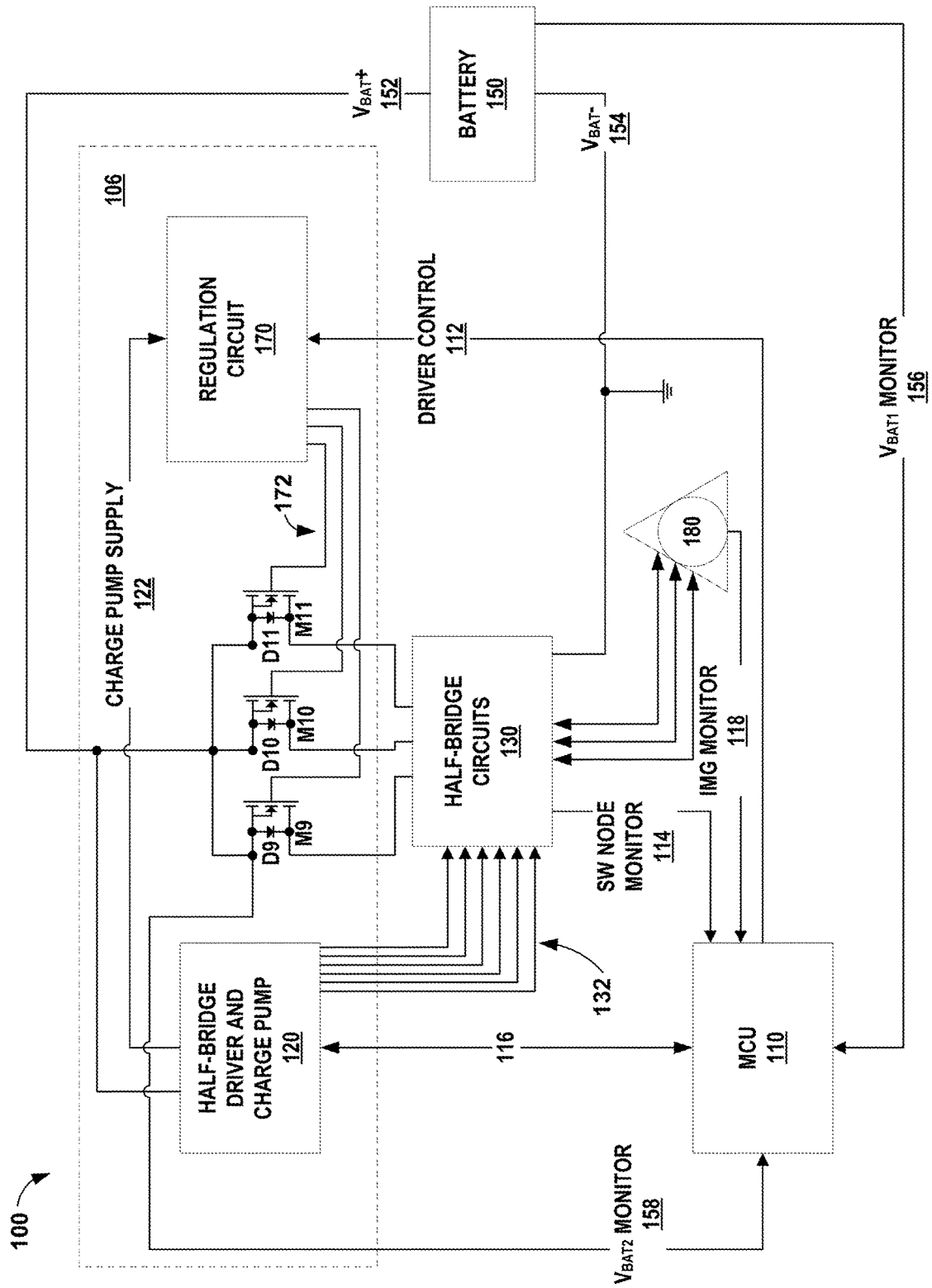
FIG. 3 is a schematic and block diagram illustrating an example series regulation circuit using an anti-series MOSFET configuration, according to one or more techniques of this disclosure.

FIG. 3 is a schematic and block diagram illustrating an example series regulation circuit using an anti-series MOSFET configuration, according to one or more techniques of this disclosure. Similar to circuits 1 and 2 described above in relation to FIGS. 1 and 2, circuit 100 also controls an integrated motor generator while in motor mode and regulates the output voltage and output current while in generator mode. However, the techniques of FIG. 100 may have advantages over circuits 1 and 20, as described below.

Circuit 100 includes IMG 180, controlled by half-bridge circuits 130, MCU 110, battery 150, and control circuit 106. Circuit 100 may function similarly to circuits 1 and 20, e.g. by controlling the conduction angle of MOSFETs M9-M11 to regulate the output voltage of IMG 180 while in generator mode. Circuit 100 may be part of or connected to an ECU. The example of circuit 100 is a three-phase system, however the techniques of this disclosure may apply to an IMG with one or more phases. Half-bridge circuits 130 may include one or more half-bridge circuits to correspond to each of the one or more phases for IMG 180.

IMG 180 is an integrated motor generator, similar to IMG 8 described above in relation to FIGS. 1 and 2. In the example of FIG. 100, IMG 180 may be used in a variety of applications, such as an ISG system, described above. In motor mode, the rotational speed, torque and other mechanical output of IMG 180 may be controlled by half-bridge circuits 130, as described above for IMG 8. In generator mode, half-bridge circuits may function as rectifier circuits, such as by current flowing through the body diodes of the low-side transistors of half-bridge circuits 130 (not shown in FIG. 3). In some examples, MCU 110 may manage synchronized negative phase cycle rectification through software by sensing each phase zero-cross timing, via sense signals from half-bridge circuits 130, such as switch node monitor signal 114. The regulated output voltage and output current of IMG 180 may charge battery 150, as well as supply other electrical loads, as described above in relation to FIGS. 1 and 2.

In some examples, MCU 110, driver and charge pump circuit 120 or a similar circuit not shown in FIG. 3 may detect each phase zero-cross timing and synchronize control of the low-side switches to manages the negative phase cycle rectification. By turning ON the low-side switches when the low-side body diodes would be conducting, circuit 100 may be more efficient. Turning on the low-side switches allows current to flow through the main transistor current channel rather than the body diode. For the same amount of current, a body diode may dissipate more power, e.g. as heat, than the main current channel. Therefore, redirecting the current through the transistor current channel, may improve the efficiency of circuit 100. In some examples, the zero crossing detection may include a window comparator feature. In some examples a window comparator may include an inverting and non-inverting comparator combined into a single comparator stage. The window comparator may detect input voltage levels that are within a specific band or window of voltages, instead of indicating whether a voltage is greater or less than some preset or fixed voltage reference point.

Similar to MCU 10 described above in relation to FIGS. 1 and 2, MCU 110 may be operatively coupled to the other portions of the circuit 100. In other words, MCU 110 may control the motor operation of IMG 180 and regulate to voltage of the generator mode operation of IMG 180. MCU 110 may send driver control signals to control circuit 106, such as regulation driver control signal 112 and half-bridge driver control signal 116. MCU 110 may include an analog to digital converter (ADC) input and other inputs to receive sense signals, such as Vbat1 monitor signal 156 directly from battery 150, Vbat2 monitor signal 158 from control circuit 106, switch node monitor signal 114 and similar signals. In some examples, MCU 110 may receive sense signals from IMG 180, such as temperature, rpm, or other information, which MCU 110 may use to control the system depicted by circuit 100.

In the example of circuit 100, control circuit 106 includes, driver and charge pump circuit 120, and regulation circuit 170 that drives the gates of regulation transistors M9, M10 and M11. In some examples, control circuit 106 may include fewer components or additional components such as MCU 110, or other components not shown in FIG. 3. In some examples, driver and charge pump circuit 120 may be combined in the same block as regulation circuit 170. In motor mode, control circuit 106 receives a power supply input at a power supply input terminal from the positive terminal of battery 150, Vbat+152. Control circuit 106 may also include one or more monitoring output terminals, such as power supply input monitor terminal Vbat2 monitor 158. The monitor output terminals may provide sense signals to MCU 110, for example to an ADC input of MCU 110.

In the example of FIG. 3, regulation transistors M9-M11 are n-channel MOSFETs including a gate terminal, a current channel including a source terminal and a drain terminal and body diodes D9-D11. The sources of each of transistors M9-M11 connect to the positive terminal of battery 150, Vbat+ 152, which may also connect to other electrical loads not shown in FIG. 3. Unlike circuit 20, the drain of each of transistors M9-M1 connects to the drain of the respective high-side transistor (not shown in FIG. 3) of each half-bridge of half-bridge circuits 130. In other words, the drain terminal of the regulation transistors M9-M11 connects to the high-side switch on a side of the high-side switch opposite a switch node (not shown in FIG. 3) of the half-bridge circuit. Said another way, the regulation transistors connect anti-series to a respective high-side switch of the one or more half-bridge circuits of half-bridge circuits 130. The connection for the regulation transistors to the half-bridge circuits may also be described as, for each phase, the current channel of a regulation transistor, e.g. transistor M9, connects to the current channel of the high-side switch such that a cathode of body diode D9 of the transistor M9 connects to a same node as the cathode of a body diode of the respective high-side switch (not shown in FIG. 3). Similarly, the cathode of body diode D10 and D11 connect to the same node as the respective cathodes of the respective high-side switches.

Regulation circuit 170 may drive the gates of transistors M9-M11 via gate signals 172 in response to driver control signal 112. In motor mode, regulation circuit 170 may ensure that transistors M9-M11 are continuously ON and half-bridge circuits 130 control the operation of IMG 180. In generator mode, regulation circuit 170 may control the ON-time, i.e. the conduction angle, of transistors M9-M11, to output an approximately constant voltage to battery 150 as well as control the output current. MCU 110 may monitor the output current, motor temperature and other parameters of IMG 180 via IMG monitor 118. In some examples, regulation circuit 170 may receive a voltage supply generated by driver and charge pump circuit 120. In other words, the conduction angle of transistors M9-M11 may be adjusted based on the output current and the average output current. A constant voltage, constant current regulation scheme may be called CVCC.

In some examples, circuit 100 may adjust the conduction angle of the additional switches, i.e. transistors M9-M11, such that a switch for a phase will switch off when the phase is close to phase zero volts, which may avoid inductive phase flyback voltage when the switch turns off. In other words, the timing for controlling the conduction angle of switch is adjusted such that the switch turns off as a phase voltage for the integrated motor generator becomes less than the battery voltage, so the phase voltage avoids inductive phase flyback voltage when the switch for the phase turns off. In this manner, controlling the conduction angle as the phase voltage approaches the battery voltage helps ensure substantially zero current through the additional switches at the time the switch turns off, which helps avoid the flyback voltage caused by the phase inductance. In some examples, MCU 110 or regulation circuit 170 may achieve conduction angle control by switching ON the respective transistor M9, M10 or M11, when the phase voltage for the respective phase is falling. MCU 114 may monitor the phase voltage and signal regulation circuit 170 to control the respective transistor at the appropriate time to avoid the inductive fly back voltage for the respective phase. In some examples, regulation circuit 170 may directly monitor the phase voltage (not shown in FIG. 3).

This technique of adjusting the conduction angles to avoid phase inductance flyback voltage may provide advantages over other techniques. For example, avoiding flyback voltage with this technique helps to avoid the need for a large oversize NMOS, which may result in a reduced footprint for a circuit. In examples that do not avoid or remove the flyback condition, the circuit may require high voltage MOSFETs with external snubber or a MOSFET with a high repetitive avalanche energy handling capability. Circuits that impose with repetitive avalanche events on a MOSFET may result in the circuit heating to be high, and high heating may lead to reliability issues. Avoiding phase inductance flyback voltage may reduce the need to dissipate heat, e.g. with heat sink, fans, etc. and therefore may provide the additional advantage of reduced cost and size.

In the example of circuit 100, driver and charge pump circuit 120 receives control signal 116 from MCU 110 and outputs gate drive signals 132 to half-bridge circuits 130 in response to control signal 116. In motor mode, driver and charge pump circuit 120 may control half-bridge circuits 130 to drive IMG 180, e.g. to start an ICE, in the example of an ISG system. In generator mode, driver and charge pump circuit 120 may control the gates of half-bridge circuits 130 to rectify the output of IMG 180, e.g. through the body diodes of the high-side and low-side transistors (not shown in FIG. 3).

The charge pump portion of driver and charge pump circuit 120 may provide a higher magnitude of voltage to the gates of the transistors to ensure the gate-source voltage is enough to turn on the transistor. For example, for the n-channel enhancement MOS transistor a drain current will only flow through the current channel when a gate voltage ($V_{GS}$) is applied to the gate terminal greater than the threshold voltage ($V_{TH}$) level. The charge pump may supply a $V_{GS}$ high enough to cause conductance to take place making the transistor a transconductance device. The reverse is true for a p-channel enhancement MOS transistor. When $V_{GS}=0$ the device is "OFF" and the channel is open. The application of a negative gate voltage to the p-type MOSFET enhances the current channel conductivity, which turns it "ON". Then for a p-channel enhancement mode MOSFET: a positive $V_{GS}$ turns the transistor "OFF", while sufficient magnitude of negative $V_{GS}$ turns the transistor "ON". In this disclosure, the terms transistor and switch may be used interchangeably, unless otherwise noted. Also, the circuit examples of this disclosure may be re-arranged to use p-channel MOSFETs in place of n-channel, and vice versa.

Circuit 100, with control circuit 106 that includes additional regulation transistors M9-M11 connected anti-series to half-bridge circuits 130, may have advantages over circuits 1 and 20, described above in relation to FIGS. 1 and 2. The configuration of circuit 100 reduces the number of power components, when compared to circuit 20 and may provide lower power dissipation when compared to circuit 1. Reducing the number of power components in the BOM, as well as reduced power dissipation may reduce the cost, complexity, size and weight of an ECU that includes circuit 100, when compared to other examples. When compared to circuit 20, circuit 100 does not include transistor M0 nor diodes D22-D26, thereby reducing the number of power components from seven to four. Using MOSFETS M9-M11 instead of SCRs S1-S3, may result in reduced voltage drop because the voltage drop through the $R_{DSon}$ of MOSFETS M9-M11 may be less than the voltage drop across SCRs S1-S3. A reduced voltage drop results in lower power dissipation and may result in reduced sized heat sinks. Additionally, the configuration of circuit 100 provides reverse battery protection with the body diodes of MOSFETS M9-M11 arranged anti-series to the half-bridge circuits 130. In other words, at higher rpm in generator mode, IMG 180 may generate higher voltages, but the body diodes, e.g. body diodes D9-D11, protect battery 150 from the higher voltages from IMG 180.

Figure 4:
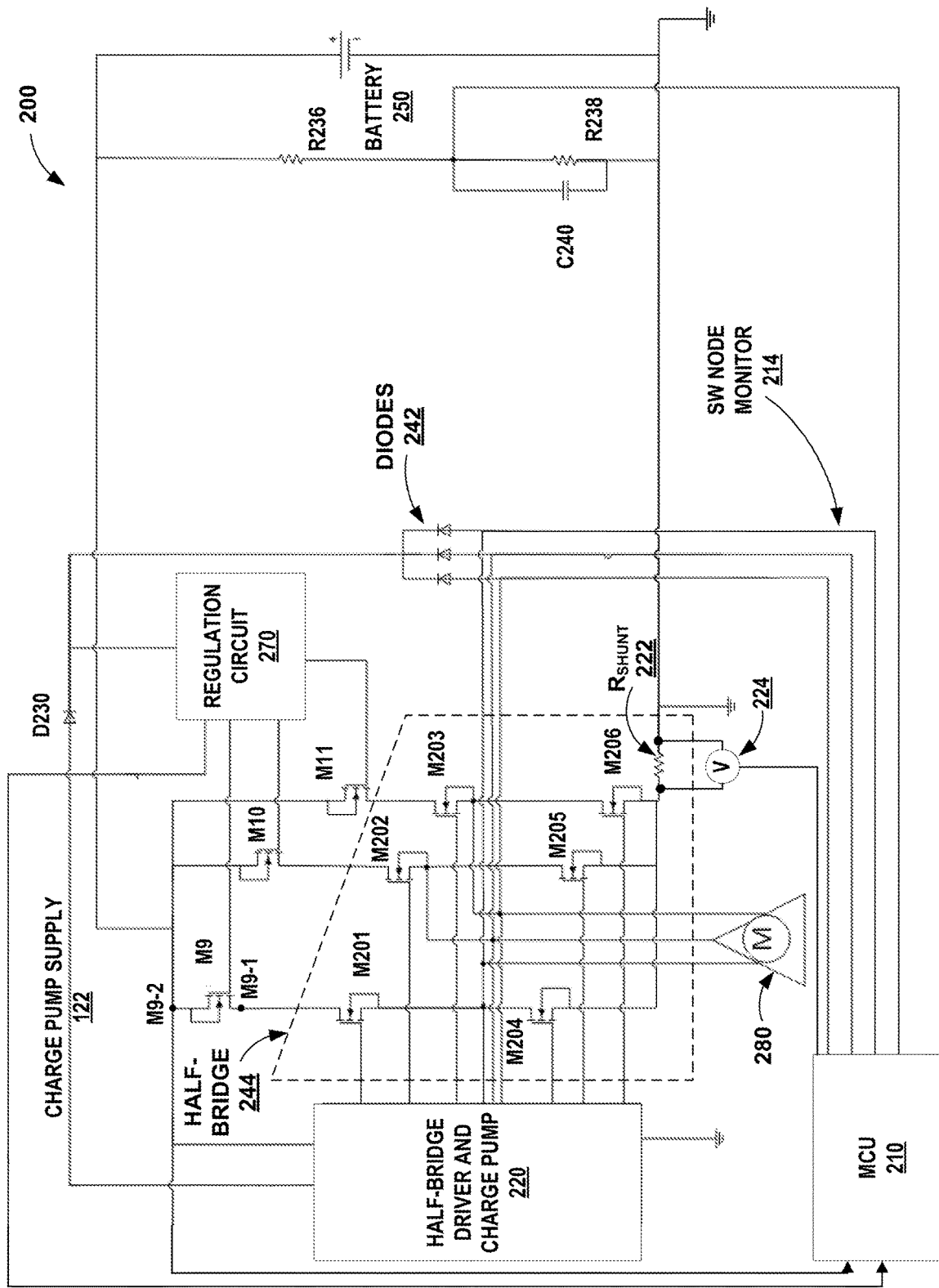
FIG. 4 is a schematic and block diagram illustrating an example implementation of a series regulation circuit using an anti-series MOSFET configuration, according to one or more techniques of this disclosure.

FIG. 4 is a schematic and block diagram illustrating an example implementation of a series regulation circuit using an anti-series MOSFET configuration, according to one or more techniques of this disclosure. Circuit 200 of FIG. 4 is an example implementation of circuit 100 described above in relation to FIG. 3.

The system depicted by circuit 200 includes IMG 280, controlled by half-bridge circuits 244, MCU 210, battery 250. Circuit 200 may function similar to circuits 100, e.g. by controlling the conduction angle of MOSFETs M9-M11 to regulate the output voltage and output current of IMG 280 while in generator mode. As with circuit 100, circuit 200 may be part of or connected to an ECU.

Half-bridge circuits 244 may include high-side switches M201, M202 and M203 and low-side switches M204, M205 and M206. The high-side switch for each phase is coupled to the low-side switch for each phase at the switch node of the half-bridge circuit. In other words, in the example of circuit 200, the source of M201 connects to the drain of M204 at the switch node for a phase of IMG 280. The half-bridge circuit is coupled to IMG 280 at the switch node of the half-bridge circuit for each phase. Similarly, the source of M202 connects to the drain of M205 at the switch node and the source of M203 connects to the drain of M206 at the switch node. Each switch node is coupled to a respective phase of IMG 280. Rshunt 222 connects the sources of the low-side transistors M204-M206 to ground.

By measuring the voltage 224 across Rshunt 222, MCU 210 may monitor the output current of IMG 280 when in generator mode. Monitoring both the charging voltage of a battery as well as the charging current may be desirable to improve battery life. For example, when high-power generator, such as IMG 280, charges some types of batteries, such as a low amp-hour battery, then current regulation may also be desirable together with voltage regulation to maintain a long battery life. MCU 210 may use shunt resistor feedback from Rshunt 222 to monitor the average charging current. Using a shunt resistor is just one example techniques to monitor current.

The configuration of circuits 100 and 200 for a three-phase system may be referred to as a B6+3 configuration. In other words, the six transistors of half-bridge circuit 244 (M201-M206) comprise "B6." The three additional regulation transistors M9-M11 comprise "+3," resulting in a B6+3 configuration.

The example of circuit 200 is a three-phase system, however the techniques of this disclosure may apply to an IMG with one or more phases. As described above in relation to FIG. 3, though depicted as two separate blocks in the example of FIG. 4, in other examples, driver and charge pump circuit 220 and regulation circuit 270 may be combined into a single switch driver circuit. The switch driver circuit (220 and 270) may receive a control input, e.g. from MCU 210, and may include three gate control output terminals for each phase. The first gate control output may electrically connect to the gate terminal an additional regulation switch, e.g. transistors M9, M10 or M11. The second gate control output terminal may be configured to control a gate terminal of a half-bridge circuit high-side switch, e.g. M201, M202, or M203. The third gate control output terminal for the phase may be configured to control a gate terminal of a half-bridge circuit low-side switch, e.g. M204, M205, or M206. A terminal of the additional regulation switch, e.g. transistors M9, M10 or M11 connects to a current channel of the high-side switch e.g. M201, M202, or M203 on a side of the high-side switch opposite a switch node of the half-bridge circuit. In the example of FIG. 4, the sources of high-side transistors M201-M203 connect the current channel to the half-bridge circuit switch node, and the drain of each high-side transistor, opposite the switch node, connect to each respective drain of the regulation transistors M9-M11. In other words, the drain of transistor M9 connects to the drain of transistor M201, the drain of transistor M10 connects to the drain of transistor M202, and the drain of transistor M11 connects to the drain of transistor M203.

As described above in relation to FIG. 3, the charge pump portion of driver and charge pump circuit 220 may output voltage such that the gate-source voltage for each transistor is enough to exceed the threshold voltage and turn ON each transistor when the voltage from the battery is not high enough to turn ON each transistor. To turn on an NMOS transistor the gate voltage exceeds the source voltage. In the example of FIG. 4, driver and charge pump circuit 220 may directly drive the gates of the high-side and low-side transistors of half-bridge 244. Driver and charge pump circuit 220 may provide a charge pump supply voltage 122 to regulation circuit 270, which in turn drives the gates of regulation transistors M9-M11.

Diodes 242 depict one example configuration to provide an optional back up supply voltage to drive the gates of regulation transistors M9-M11 in the event of a weak or malfunctioning charge pump circuit. When in use, back up supply through diodes D242 may drive the gates of M9,10, 11 at the high electrical frequency of generator 280. At higher electrical frequency, i.e. high ICE rpm, phase voltages may be higher than battery voltage. When using the backup supply, regulation circuit 270 may filter D242 output and clamp the voltage received through the back up supply to the within MOSFET gate rating for regulation transistors M9-M11. Diode D230 is blocking reverse current to charge pump circuit when back up supply is present through diodes D242. Because the charge pump provides the voltage to drive the gates of regulation transistors M9-M11, diodes D230,242 can be used as small current diodes and the diode voltage rating may be low, for example, rated at less than 60V.

The anodes of diodes 242 connect to the switch node of each phase of half-bridge circuit 244, as well as to switch node monitor signals 214 to MCU 210. As described above in relation to FIG. 3, MCU 210 may receive switch node monitor signals 214 at an ADC of MCU 210. MCU 210 may also receive sense signals from IMG 280 (not shown in FIG. 4). The MCU may determine the conduction time of the transistors in circuit 200 by monitoring parameters of the ISG system, such as battery voltage, the switch node voltage for each phase, the zero-crossing point of each phase and similar parameters. MCU 210 may also monitor the voltage, or other parameters, of battery 250, for example via the resistor divider circuit which includes resistors R236, R238 and capacitor C240.

Similar to described above in relation to FIGS. 1-3, in operation, MCU 210 of FIG. 4 may control the gates of half-bridge circuit 244 and regulation transistors M9-M11 while IMG 280 is in motor mode to control the torque, rpm and so on of IMG 280, by controlling the electrical energy from battery 250 to IMG 280. For example, in motor mode, the switch driver circuit, i.e. driver and charge pump circuit 220 and regulation driver 270 may cause transistors M9-M11 may be continuously ON, i.e. conducting energy from battery 250 with a low $R_{DSon}$. Driver and charge pump circuit 220 may control transistors M201-M206 of half-bridge circuit 244 to control IMG 280 as a motor. In some examples, MCU 210 may send driver control signals, such as regulation driver control signal 112 and half-bridge driver control signal 116 depicted in FIG. 3 (not shown in FIG. 4) to control the operation of driver and charge pump circuit 220 and regulation circuit 270 in both motor mode and generator mode.

In generator mode, driver and charge pump circuit 220 may control the gates of half-bridge circuit 244 to rectify and regulate the voltage from IMG 280. For example, M201-M203 may be held OFF (i.e. not conducting). The body diodes of M201-M203 may act as diode and block battery discharge when the output phase voltages at the switch nodes are lower, i.e. when IMG 208 is a low rpm. Similarly, M204-M206 may be held OFF and the body diodes of M204-M206 rectify the alternating current signal from IMG 280. In some examples, MCU 210 may manage synchronized negative phase cycle rectification through software by sensing each phase zero cross detection either via SW node monitor signals 214 to an ADC or based on an external interrupt. Driver and charge pump circuit 220 may control the conduction angle, i.e. the time each regulation transistor M9-M11 is conducting, to regulate the output voltage from IMG 280. The electrical energy from IMG 280 in generator mode may charge battery 250, as well as support other electrical loads in the vehicle, such as lighting, LED indicators, fans and other electrical loads.

FIG. 5 is a flow chart illustrating an example operation of a series regulation circuit for an integrated motor generator according to one or more techniques of this disclosure. The steps of FIG. 5 will be described in terms of FIGS. 3 and 4, unless otherwise noted.

For a system that includes an IMG, such as an ISG system or power assist system, the IMG may operate in either motor mode or generator mode. In generator mode, the system regulates the output voltage of the IMG, such as IMG 180 or IMG 280 to provide electrical power, for example to charge a battery or provide power to other electrical loads. At low rpm, the IMG may output a low voltage and the system, according to one or more techniques of this disclosure, is configured to prevent unwanted battery discharge while the IMG outputs low voltage. A control circuit, e.g. comprising driver and charge pump circuit 120 or 220 may turn off each respective high-side switch (e.g. transistors M201-M203) and each respective low-side switch (e.g. transistors M204-M205) of one or more half-bridge circuits, which are configured to control IMG 280 while the integrated motor generator operates in motor mode (90). Turning off the high-side switches causes the body diodes of the high-side switches to block battery discharge when phase voltages are lower. Turning off the low-side switches causes the body diodes of the low-side switches to act as rectifier as a first step to convert the output of IMG 280 to a DC output voltage.

While IMG 280 operates in generator mode, the system may control a conduction time of one or more series regulation switches, e.g. M9-M11 (92). The regulation switches, e.g. transistors M9-M11, are connected such that the current channel of the switch is anti-series to the high-side transistor of the half-bridge circuit that controls the IMG in motor mode. When the rpm of IMG 280 increases, the rms output voltage of IMG 280 also increases. In this configuration, the regulation switches, transistors M9-M1, may control the average current, and the voltage, that comes through the body diodes of the high-side switches, e.g. M201-M203, by changing the ON time, or conduction angle, of each regulation switch. In some examples, MCU 110 may control the conduction time of transistors M9-M11 via driver control signal 112 to regulation circuit 170.

In one or more examples, the functions described above may be implemented in hardware, software, firmware, or any combination thereof. For example, the various components of FIG. 3, such as MCU 110 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media or memory. Data storage media may be any available media that can be accessed by one or more computers or one or more processors to retrieve instructions, code and/or data structures for implementation of the techniques described in this disclosure. By way of example, and not limitation, such computer-readable storage media, can comprise RAM, ROM, EEPROM, flash memory, or any other medium that can be used to store desired program code in the form of instructions or data structures and that can be accessed by a computer.

Instructions may be executed by processing circuitry, such as one or more DSPs, general purpose microprocessors, ASICs, FPGAs, or other equivalent integrated or discrete logic circuitry. Accordingly, the term "processor," as used herein, may refer to any of the foregoing structure or any other structure suitable for implementation of the techniques described herein. In addition, the functionality described herein may be provided within dedicated hardware and/or software modules. Also, the techniques could be fully implemented in one or more circuits or logic elements.

The techniques of this disclosure may be implemented in a wide variety of devices or apparatuses, e.g. an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware. Other techniques of this disclosure are described in the following examples.

Example 1

A control circuit for an integrated motor generator, the circuit comprising: a switch comprising a gate terminal and a current channel including a first terminal and a second terminal, and a switch driver circuit comprising a first gate control output terminal, a second gate control output terminal and a third gate control output terminal. The first gate control output electrically connects to the gate terminal of the switch, the second gate control output terminal is configured to control a gate terminal of a half-bridge circuit high-side switch, and the third gate control output terminal is configured to control a gate terminal of a half-bridge circuit low-side switch; and wherein the first terminal of the switch connects to the high-side switch on a side of the high-side switch opposite a switch node of the half-bridge circuit.

Example 2

The control circuit of example 1, wherein the current channel of the switch connects to the current channel of the high-side switch such that a cathode of a body diode of the switch connects to a same node as a cathode of a body diode of the high-side switch.

Example 3

The control circuit of any of examples 1-2 or any combination thereof, wherein the first terminal of the switch is a drain of the switch and the drain of the switch connects to a drain of the high-side switch.

Example 4

The control circuit of any combination of examples 1-3, wherein the switch is a first switch, the circuit further comprising a second switch and a third switch, wherein: a first terminal of the second switch connects to a current channel of a second high-side switch, a first terminal of the third switch connects to a current channel of a third high-side switch.

Example 5

The control circuit of any combination of examples 1-4, further comprising a charge pump circuit, wherein the charge pump circuit is configured to supply a voltage to at least the first gate control output terminal.

Example 6

The control circuit of any combination of examples 1-5, wherein the switch driver circuit is a first switch driver circuit, the circuit further comprising a second switch driver circuit configured to: receive a voltage from the charge pump circuit; output the first gate control output to the gate terminal of the switch Example 7

The control circuit of any combination of examples 1-6, wherein the circuit is configured to regulate an output voltage of the integrated motor generator while the integrated motor generator operates in generator mode.

Example 8

The control circuit of any combination of examples 1-7, wherein the circuit is configured to regulate the output voltage of the integrated motor generator to charge a battery.

Example 9

The control circuit of any combination of examples 1-8, wherein the circuit is configured to regulate the output voltage and an output current by controlling a conduction angle of the switch.

Example 10

The control circuit of any combination of examples 1-9, wherein a timing for controlling the conduction angle of switch is adjusted such that the switch turns off as a phase voltage for the integrated motor generator approaches battery voltage, such that the phase voltage avoids inductive phase fly back voltage.

Example 11

The control circuit of any combination of examples 1-10, wherein the circuit is configured to: turn off the half-bridge circuit high-side switch and turn off half-bridge circuit low-side switch; and regulate the output voltage of the integrated motor generator by controlling a conduction time of the switch.

Example 12

The control circuit of any combination of examples 1-11, wherein the circuit is configured to turn on the switch while the integrated motor generator operates in motor mode.

Example 13

A system comprising: an integrated motor generator configured to operate in motor mode and in generator mode, a half-bridge circuit, comprising a high-side switch coupled to a low-side switch. The half-bridge circuit is: coupled to the integrated motor generator at the switch node of the half-bridge circuit; and configured to control the operation of the integrated motor generator. The system also includes a control circuit comprising: a switch comprising a gate terminal and a current channel including a first terminal and a second terminal, a switch driver circuit comprising a control input, a first gate control output terminal, a second gate control output terminal and a third gate control output terminal. The first gate control output electrically connects to the gate terminal of the switch, the second gate control output terminal is configured to control a gate terminal of a half-bridge circuit high-side switch, the third gate control output terminal is configured to control a gate terminal of a half-bridge circuit low-side switch, and the first terminal of the switch connects to a current channel of the high-side switch on a side of the high-side switch opposite the switch node of the half-bridge circuit. The system also includes processing circuitry operatively coupled to the half-bridge circuit and the control circuit and configured to receive sense signals from the half-bridge circuit and the integrated motor generator.

Example 14

The system of example 13, wherein the current channel of the switch connects to the current channel of the high-side switch such that a cathode of a body diode of the switch connects to a same node as a cathode of a body diode of the high-side switch.

Example 15

The system of any combination of examples 13-14, wherein the first terminal of the switch is a drain of the switch and the drain of the switch connects to a drain of the high-side switch.

Example 16

The system of any combination of examples 13-15, wherein the switch is a first switch, the circuit further comprising a second switch and a third switch, wherein: a first terminal of the second switch to connects to a current channel of a second high-side switch, a first terminal of the third switch to connects to a current channel of a third high-side switch.

Example 17

The system of any combination of examples 13-16, wherein, while the integrated motor generator operates in generator mode the circuit is configured to: turn off the half-bridge circuit high-side switch and turn off half-bridge circuit low-side switch; regulate the output voltage of the integrated motor generator by controlling a conduction time of the switch.

Example 18

The system of any combination of examples 13-17, wherein the circuit is configured to regulate the output voltage of the integrated motor generator to charge a battery.

Example 19

A method of regulating an output voltage of an integrated motor generator, the method comprising: turning off each respective high-side switch and each respective low-side switch of one or more half-bridge circuits, wherein the one or more half-bridge circuits are configured to control the integrated motor generator while the integrated motor generator operates in motor mode. While the integrated motor generator operates in generator mode, controlling a conduction time of one or more series regulation switches, wherein each series regulation switch of the one or more series regulation switches is connected anti-series to a respective high-side switch of the one or more half-bridge circuits.

Example 20

The method of example 19, wherein controlling the conduction time of the one or more series regulation switches comprises applying a voltage to a gate of the one or more series regulation switches, wherein the voltage is generated by a charge pump circuit.

Various examples of the disclosure have been described. These and other examples are within the scope of the following claims.

The invention claimed is:

1. A control circuit for an integrated motor generator, the circuit comprising:
   a half-bridge circuit comprising a high-side switch and a low-side switch;
   a switch, separate from the half-bridge circuit and arranged to control current to the half-bridge circuit, the switch comprising a gate terminal and a current channel including a first terminal and a second terminal; and
   a switch driver circuit comprising a first gate control output terminal, a second gate control output terminal and a third gate control output terminal wherein:
      the first gate control output electrically connects to the gate terminal of the switch,
      the second gate control output terminal is configured to control a gate terminal of the half-bridge circuit high-side switch, and
      the third gate control output terminal is configured to control a gate terminal of the half-bridge circuit low-side switch; and
      wherein the first terminal of the switch connects to the high-side switch on a side of the high-side switch opposite a switch node of the half-bridge circuit.

2. The circuit of claim 1, wherein the current channel of the switch connects to the current channel of the high-side switch such that a cathode of a body diode of the switch connects to a same node as a cathode of a body diode of the high-side switch.

3. The circuit of claim 1, wherein the first terminal of the switch is a drain of the switch and the drain of the switch connects to a drain of the high-side switch.

4. The circuit of claim 1, wherein the switch is a first switch, the circuit further comprising a second switch and a third switch, wherein:
   a first terminal of the second switch connects to a current channel of a second high-side switch,
   a first terminal of the third switch connects to a current channel of a third high-side switch.

5. The circuit of claim 1, further comprising a charge pump circuit, wherein the charge pump circuit is configured to supply a voltage to at least the first gate control output terminal.

6. The circuit of claim 5, wherein the switch driver circuit is a first switch driver circuit, the circuit further comprising a second switch driver circuit configured to:
   receive a voltage from the charge pump circuit;
   output the first gate control output to the gate terminal of the switch.

7. The circuit of claim 1, wherein the circuit is configured to regulate an output voltage of the integrated motor generator while the integrated motor generator operates in generator mode.

8. The circuit of claim 7, wherein the circuit is configured to regulate the output voltage of the integrated motor generator to charge a battery.

9. The circuit of claim 7, wherein the circuit is configured to regulate the output voltage and an output current by controlling a conduction angle of the switch.

10. The circuit of claim 9, wherein a timing for controlling the conduction angle of switch is adjusted such that the switch turns off as a phase voltage for the integrated motor generator approaches battery voltage, such that the phase voltage avoids inductive phase fly back voltage.

11. The circuit of claim 9, wherein the circuit is configured to:
   turn off the half-bridge circuit high-side switch and turn off half-bridge circuit low-side switch; and
   regulate the output voltage of the integrated motor generator by controlling a conduction time of the switch.

12. The circuit of claim 1, wherein the circuit is configured to turn on the switch while the integrated motor generator operates in motor mode.

13. A system comprising:
   an integrated motor generator configured to operate in motor mode and in generator mode;
   a half-bridge circuit, comprising a high-side switch coupled to a low-side switch, wherein the half-bridge circuit is:
      coupled to the integrated motor generator at the switch node of the half-bridge circuit; and
      configured to control the operation of the integrated motor generator;
   a control circuit comprising:
      a switch, separate from the half-bridge circuit and arranged to control current to the half-bridge circuit, the switch comprising a gate terminal and a current channel including a first terminal and a second terminal;
      a switch driver circuit comprising a control input, a first gate control output terminal, a second gate control output terminal and a third gate control output terminal wherein:
         the first gate control output electrically connects to the gate terminal of the switch,
         the second gate control output terminal is configured to control a gate terminal of a half-bridge circuit high-side switch,
         the third gate control output terminal is configured to control a gate terminal of a half-bridge circuit low-side switch, and
         the first terminal of the switch connects to a current channel of the high-side switch on a side of the high-side switch opposite the switch node of the half-bridge circuit; and
      processing circuitry operatively coupled to the half-bridge circuit and the control circuit and configured to receive sense signals from the half-bridge circuit and the integrated motor generator.

14. The system of claim 13, wherein the current channel of the switch connects to the current channel of the high-side switch such that a cathode of a body diode of the switch connects to a same node as a cathode of a body diode of the high-side switch.

15. The system of claim 13, wherein the first terminal of the switch is a drain of the switch and the drain of the switch connects to a drain of the high-side switch.

16. The circuit of claim 1, wherein the switch is a first switch, the circuit further comprising a second switch and a third switch, wherein:
   a first terminal of the second switch to connects to a current channel of a second high-side switch,
   a first terminal of the third switch to connects to a current channel of a third high-side switch.

17. The circuit of claim 1, wherein, while the integrated motor generator operates in generator mode the circuit is configured to:
   turn off the half-bridge circuit high-side switch and turn off half-bridge circuit low-side switch;

regulate the output voltage of the integrated motor generator by controlling a conduction time of the switch.

18. The circuit of claim 7, wherein the circuit is configured to regulate the output voltage of the integrated motor generator to charge a battery.

19. A method of regulating an output voltage of an integrated motor generator, the method comprising:
- turning off each respective high-side switch and each respective low-side switch of one or more half-bridge circuits, wherein the one or more half-bridge circuits are configured to control the integrated motor generator while the integrated motor generator operates in motor mode; and
- while the integrated motor generator operates in generator mode, controlling a conduction time of one or more series regulation switches, wherein each series regulation switch of the one or more series regulation switches is connected anti-series to a respective high-side switch of the one or more half-bridge circuits.

20. The method of claim 19, wherein controlling the conduction time of the one or more series regulation switches comprises applying a voltage to a gate of the one or more series regulation switches, wherein the voltage is generated by a charge pump circuit.

* * * * *